United States Patent
Slack et al.

(10) Patent No.: US 9,631,606 B2
(45) Date of Patent: Apr. 25, 2017

(54) SYSTEM AND METHOD FOR THRUST-SPEED CONTROL OF A WIND TURBINE

(71) Applicant: General Electric Company, Schenectady, NY (US)

(72) Inventors: Robert Peter Slack, Seattle, WA (US); Brandon Shane Gerber, Charleston, SC (US); Thomas Franklin Perley, Simpsonville, SC (US); Bernardo Adrian Movsichoff, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 575 days.

(21) Appl. No.: 14/251,879

(22) Filed: Apr. 14, 2014

(65) Prior Publication Data
US 2015/0292483 A1 Oct. 15, 2015

(51) Int. Cl.
*F03D 7/02* (2006.01)
*F03D 9/00* (2016.01)
*F03D 7/04* (2006.01)

(52) U.S. Cl.
CPC .......... *F03D 7/0276* (2013.01); *F03D 7/028* (2013.01); *F03D 7/0224* (2013.01); *F03D 7/043* (2013.01);
(Continued)

(58) Field of Classification Search
None
See application file for complete search history.

(56) References Cited

U.S. PATENT DOCUMENTS 5,289,041 A * 2/1994 Holley ................. F03D 7/0224
290/44
5,652,485 A 7/1997 Spiegel et al.
(Continued)

FOREIGN PATENT DOCUMENTS

EP 2 302 207 A1 3/2011
EP 2 444 659 A1 4/2012
(Continued)

OTHER PUBLICATIONS

Johnson "Adaptive Torque Control of Variable Speed Wind Turbines", Aug. 2004, 107 pages.*
(Continued)

*Primary Examiner* — Van Nguyen
(74) *Attorney, Agent, or Firm* — Dority & Manning, P.A.

(57) ABSTRACT

The present subject matter is directed to a system and method for dynamically controlling a wind turbine. The method includes operating the wind turbine based on a thrust set point and a speed set point. A next step includes determining a desired change in actual speed of the wind turbine in response to control actuations starting from an instantaneous operating point. The method also includes determining a desired change in thrust of the wind turbine in response to control actuations starting from the instantaneous operating point. Next, the method determines at least one parameter set point that achieves the desired change in speed and the desired change in thrust and controls the wind turbine based on the parameter set point so as to maintain the actual thrust and the actual speed of the wind turbine within a certain tolerance of the thrust set point and the speed set point, thereby regulating loads acting on the wind turbine while simultaneously maintaining optimal or near optimal power output.

20 Claims, 9 Drawing Sheets

(52) U.S. Cl.
CPC ............ *F03D 7/045* (2013.01); *F03D 9/002* (2013.01); *F05B 2270/101* (2013.01); *F05B 2270/327* (2013.01); *F05B 2270/331* (2013.01); *Y02E 10/723* (2013.01)

(56) References Cited

U.S. PATENT DOCUMENTS

| | | | |
|---|---|---|---|
| 6,888,262 | B2 | 5/2005 | Blakemore |
| 7,004,724 | B2 | 2/2006 | Pierce et al. |
| 7,175,389 | B2 | 2/2007 | Moroz |
| 7,281,891 | B2 | 10/2007 | Smith et al. |
| 7,342,323 | B2 | 3/2008 | Avagliano et al. |
| 7,346,462 | B2 | 3/2008 | Delmerico |
| 7,351,033 | B2* | 4/2008 | McNerney ............ F03D 7/0224 416/1 |
| 7,476,485 | B2 | 1/2009 | Hatakeyama et al. |
| 7,476,985 | B2 | 1/2009 | Llorente Gonzalez |
| 7,505,833 | B2 | 3/2009 | Delmerico et al. |
| 7,573,149 | B2 | 8/2009 | Kammer et al. |
| 7,613,548 | B2 | 11/2009 | Cardinal et al. |
| 7,822,560 | B2 | 10/2010 | LeMieux |
| 7,861,583 | B2 | 1/2011 | Honhoff et al. |
| 7,870,783 | B2 | 1/2011 | Yoshida et al. |
| 7,883,317 | B2 | 2/2011 | Ormel et al. |
| 7,942,629 | B2 | 5/2011 | Shi et al. |
| 7,950,901 | B2 | 5/2011 | Barbu et al. |
| 7,964,979 | B2* | 6/2011 | Miranda ............... F03D 7/0224 290/44 |
| 7,979,167 | B2 | 7/2011 | Delmerico et al. |
| 8,025,476 | B2 | 9/2011 | Zheng et al. |
| 8,035,241 | B2 | 10/2011 | Subramanian et al. |
| 8,050,887 | B2 | 11/2011 | Ahmann |
| 8,050,899 | B2 | 11/2011 | Giguere et al. |
| 8,093,737 | B2 | 1/2012 | Wittekind et al. |
| 8,128,362 | B2 | 3/2012 | Andersen et al. |
| 8,212,373 | B2 | 7/2012 | Wittekind et al. |
| 8,257,040 | B2 | 9/2012 | Chen et al. |
| 8,262,354 | B2 | 9/2012 | Hoffmann |
| 8,301,310 | B2 | 10/2012 | Nim |
| 8,328,514 | B2 | 12/2012 | Viripullan et al. |
| 8,360,722 | B2 | 1/2013 | Hoffmann et al. |
| 8,366,389 | B2* | 2/2013 | Hoffmann ............ F03D 7/0224 416/1 |
| 8,803,352 | B1* | 8/2014 | Koerber ............... F03D 7/0224 290/44 |
| 9,249,779 | B2* | 2/2016 | Bjerge ................. F03D 7/0224 |
| 9,341,159 | B2* | 5/2016 | Koerber ............... F03D 7/0224 |
| 2006/0273595 | A1 | 12/2006 | Avagliano et al. |
| 2008/0195255 | A1 | 8/2008 | Lutze et al. |
| 2009/0088991 | A1 | 4/2009 | Brzezowski et al. |
| 2009/0099702 | A1 | 4/2009 | Vyas et al. |
| 2010/0241280 | A1 | 9/2010 | Garcia Barace et al. |
| 2010/0283245 | A1 | 11/2010 | Gjerlov et al. |
| 2010/0312594 | A1 | 12/2010 | Andersen et al. |
| 2011/0084485 | A1 | 4/2011 | Miranda et al. |
| 2011/0153096 | A1 | 6/2011 | Pal et al. |
| 2012/0014794 | A1 | 1/2012 | Bailey |
| 2012/0027586 | A1 | 2/2012 | Hoffmann et al. |
| 2012/0078517 | A1 | 3/2012 | Bogucki |
| 2012/0086209 | A1 | 4/2012 | Obrecht |
| 2012/0133138 | A1 | 5/2012 | Sorensen et al. |
| 2012/0165996 | A1 | 6/2012 | Olesen |
| 2013/0033040 | A1 | 2/2013 | Bowyer et al. |
| 2013/0156577 | A1 | 6/2013 | Esbensen et al. |
| 2013/0243590 | A1 | 9/2013 | Edenfeld |
| 2014/0219796 | A1* | 8/2014 | Caruso ................. F03D 7/0244 416/1 |
| 2015/0056072 | A1* | 2/2015 | Perley .................. F03D 7/0288 416/1 |
| 2015/0337806 | A1* | 11/2015 | Damgaard ............ F03D 7/047 700/287 |

FOREIGN PATENT DOCUMENTS

| | | |
|---|---|---|
| EP | 2679810 A2 | 1/2014 |
| WO | WO 2005/010358 A1 | 2/2005 |
| WO | WO 2008/124185 A1 | 10/2008 |
| WO | WO 2010/069534 A1 | 6/2010 |
| WO | WO 2011/015383 A2 | 2/2011 |
| WO | WO 2011/076818 A2 | 6/2011 |
| WO | WO 2011/076875 A2 | 6/2011 |
| WO | WO 2011/101475 A2 | 8/2011 |
| WO | WO 2011/157271 A2 | 12/2011 |
| WO | WO 2011/160634 A1 | 12/2011 |
| WO | WO 2012/044161 A2 | 4/2012 |
| WO | WO 2012/103668 A1 | 8/2012 |
| WO | WO 2012/149984 A1 | 11/2012 |
| WO | WO 2012/164387 A1 | 12/2012 |
| WO | WO 2013/000468 A1 | 1/2013 |
| WO | WO 2013/091638 A1 | 6/2013 |

OTHER PUBLICATIONS

Hansen et al. "Control design for a pitch-regulated, variable speed wind turbine", Jan. 2005, 84 pages.*
Related U.S. Appl. No. 13/927,202, filed Jun. 26, 2013.
Related U.S. Appl. No. 13/970,930, filed Aug. 20, 2013.
Related U.S. Appl. No. 14/032,279, filed Sep. 20, 2013.
Related U.S. Appl. No. 14/104,217, filed Dec. 12, 2013.
Wright et al., "Testing Controls to Mitigate Fatigue Loads in the Controls Advanced Research Turbine", 17th Mediterranean Conference on Control & Automation, IEEE, Piscataway, NJ, USA, pp. 1275-1282, Jun. 24, 2009.
Laks et al., "Multi-Blade Coordinate and Direct Techniques for Asymptotic Disturbance Rejection in Wind Turbines", 51st Annual Conference on Decision and Control, IEEE, pp. 2557-2562, Dec. 10, 2012.
European Search Report and Written Opinion issued in connection with corresponding EP Application No. 15160454.3-1607 dated Sep. 1, 2015.

* cited by examiner

SYSTEM AND METHOD FOR THRUST-SPEED CONTROL OF A WIND TURBINE

FIELD OF THE INVENTION

The present invention relates generally to wind turbines, and more particularly, to a system and method for thrust-speed control of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The amount of power that may be produced by a wind turbine is typically constrained by structural limitations of the individual wind turbine components. The power available from the wind is proportional to the area of the rotor, and the square of the rotor diameter. Thus, the amount of power produced at different wind speeds can be significantly higher by increasing the diameter of the rotor of the wind turbine. Such an increase in rotor size, however, also increases mechanical loads and material costs with what may not be a proportional increase in energy production. Further, though it is helpful to control power and rotor speed, thrust from the wind on the rotor truly drives many dominant fatigue loads, along with any asymmetry of that thrust. The terms "thrust," "thrust value," "thrust parameter" or similar as used herein are meant to encompass a force acting on the wind turbine due to the wind and in the general direction of the wind. The thrust force comes from a change in pressure as the wind passes the wind turbine and slows down. Further, the terms "thrust," "thrust value," "thrust parameter" or similar as used herein may describe an input to a control method, a value that changes in direct proportion to thrust in an operating region of interest (e.g. individual or average out-of-plane blade or flapwise bending, tower bending, or tower top acceleration), or an estimate of thrust based upon any combination of the above quantities or with other standard measured quantities such as wind speed, speed, or power of the machine. The terms "thrust," "thrust value," "thrust parameter" or similar may also describe a forward-looking estimate of future thrust, e.g. as determined by a sensor that measures wind speed upwind of the rotor plane.

Recent developments in the wind industry have led to new methods of mechanical-load-reducing controls that allow larger rotor diameters to be employed with less than proportional increases in material costs. For example, some modern wind turbines may implement drive train and tower dampers to reduce loads. In addition, modern wind turbines may utilize individual and collective blade pitch control mechanisms to reduce fatigue and extreme loads, thereby enabling higher ratios between rotor diameter and structural loads while also lowering the cost of energy.

Still additional wind turbines have employed partial control of thrust, such as "peak shavers," "thrust clippers," and/or "thrust control" in the peak thrust regions only. Such control technologies may implement limitations on fine pitch settings in certain conditions, or other variants, but do not employ a full closed-loop control on thrust. Though thrust is related to power and speed of the wind turbine, the thrust is not synonymous or linearly proportional with either. Thus, in some operating regions, it may be possible to change the thrust acting on the wind turbine through controls with less than proportional effect on power, or vice versa. Further, it may be possible to control speed and thrust almost independently in some regions, (e.g. when considering dynamic excursions from a mean value rather than long-term average values), however, current control technologies do not control speed and thrust in this manner. In addition, many modern control techniques do not address thrust control and/or even accentuate thrust variations in attempting to maintain constant power output through certain conditions.

Accordingly, a system and method that addresses the aforementioned problems would be welcomed in the technology. For example, a system and method that incorporates thrust-speed control to increase rotor diameter at a given structural mass and/or energy production while also reducing loads acting on the turbine would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for dynamically controlling a wind turbine. The method includes operating the wind turbine based on a thrust set point and a speed set point. A next step includes determining, via a processor, a desired change in actual speed of the wind turbine in response to control actuations starting from an instantaneous operating point. The method also includes determining, via the processor, a desired change in actual thrust of the wind turbine in response to control actuations starting from the instantaneous operating point. Next, the method determines at least one parameter set point that will achieve the desired change in speed and the desired change in thrust and controls the wind turbine based on the parameter set point so as to maintain the actual thrust and the actual speed of the wind turbine within a certain tolerance of the thrust set point and the speed set point, thereby regulating loads acting on the wind turbine.

In one embodiment, the instantaneous operating point includes at least one of a wind speed, a pitch angle, a generator speed, a power output, a torque output, a tip speed ratio, a rotor speed, a power coefficient, a torque coefficient, a thrust coefficient, a thrust, a thrust response, a blade bending moment, a shaft bending moment, a tower bending moment, a speed response, or similar. In another embodiment, the method may further include adjusting at least one of the thrust set point or the speed set point based on the instantaneous operating point. In additional embodiments, when a wind speed is above a rated wind speed, the thrust set point is adjusted according to a filtered or unfiltered power output. Further, when the wind speed is below the rated wind speed, the thrust set point is adjusted according to a filtered or unfiltered pitch angle. In addition, when the wind speed is at or near a rated wind speed, the thrust set point is adjusted based on a maximum design thrust of the wind turbine.

In a further embodiment, the method may also include a step of determining a desired change in power output based on a difference between an actual power and a power set point and determining a desired change in pitch angle based on a difference between an actual pitch and an optimal fine pitch. In still additional embodiments, the change in actual speed of the wind turbine may be determined by: determining an actual or measured speed of the wind turbine, and determining a difference between the speed set point and the actual speed. In various embodiments, the actual speed may be reflective of a generator speed, a rotor speed, a tip speed ratio, or similar.

In additional embodiments, the desired change in actual thrust of the wind turbine may be determined by: determining an actual or measured thrust of the wind turbine, and determining a difference between the thrust set point and the actual thrust. Further, the actual thrust may be determined by utilizing at least one of the following: one or more sensors, a plurality of equations, one or more aerodynamic performance maps, or one or more look-up tables.

In another embodiment, the step of determining the parameter set point may further include utilizing multi-variable control or a multi-objective optimization function. More specifically, the multi-variable control may include at least one of a cost function, a loss function, a transfer function, or similar.

In still further embodiments, the method may also include determining the change in actual speed and the change in actual thrust by calculating at least one partial derivative of the thrust or the speed with respect to the operating point and one or more control actuations. For example, in various embodiments, the following partial derivatives may be calculated: $\delta T/\delta\theta$, $\delta T/\delta M$, $\delta T/\delta U$, $\delta\omega/\delta\theta$, $\delta\omega/\delta M$, $\delta\omega/\delta U$, where T is the thrust, $\theta$ is the pitch angle, M is the moment or torque, $\omega$ is rotor speed, and U is the wind speed. In yet another embodiment, the parameter set point may include at least one of a pitch angle set point, a torque set point, or similar. For example, in further embodiments, the parameter set point may include a set point or location for one or more aerodynamic devices on the rotor blades of the wind turbine, including, but not limited to flaps, tabs, active air blowing or suction, or similar.

In another aspect, a system for dynamically controlling a wind turbine is disclosed. The system includes a processor and a controller communicatively coupled to the processor. The processor is configured to: operate the wind turbine based on a thrust set point and a speed set point, determine a desired change in actual speed of the wind turbine in response to control actuations starting from an instantaneous operating point, determine a desired change in actual thrust of the wind turbine in response to control actuations starting from the instantaneous operating point, and determine a parameter set point that will achieve the desired change in actual speed and the desired change in actual thrust. The controller is configured to control the wind turbine based on the parameter set point so as to maintain the actual thrust and the actual speed of the wind turbine within a certain tolerance of the thrust set point and the speed set point, thereby loads acting on the wind turbine while simultaneously maintaining optimal or near-optimal power output. It should be understood that the system may also include any of the additional features described herein.

In still another aspect, the present subject matter is directed to a method for dynamically controlling a wind turbine. The method includes operating the wind turbine based on a thrust set point and a speed set point. Another step includes determining, via a processor, a desired change in actual rotor speed of the wind turbine in response to control actuations starting from an instantaneous operating point. The method also includes determining, via the processor, a desired change in actual thrust of the wind turbine in response to control actuations starting from the instantaneous operating point. The method then includes utilizing, via the processor, multi-variable control to determine a pitch set point and a torque set point that will achieve the desired change in actual rotor speed and the desired change in actual thrust. The wind turbine may then be controlled based on the pitch set point and the torque set point so as to maintain the actual thrust and the actual speed of the wind turbine within a certain tolerance of the thrust set point and the speed set point respectively, thereby regulating loads acting on the wind turbine. It should be understood that the method may also include any of the additional steps and/or features described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
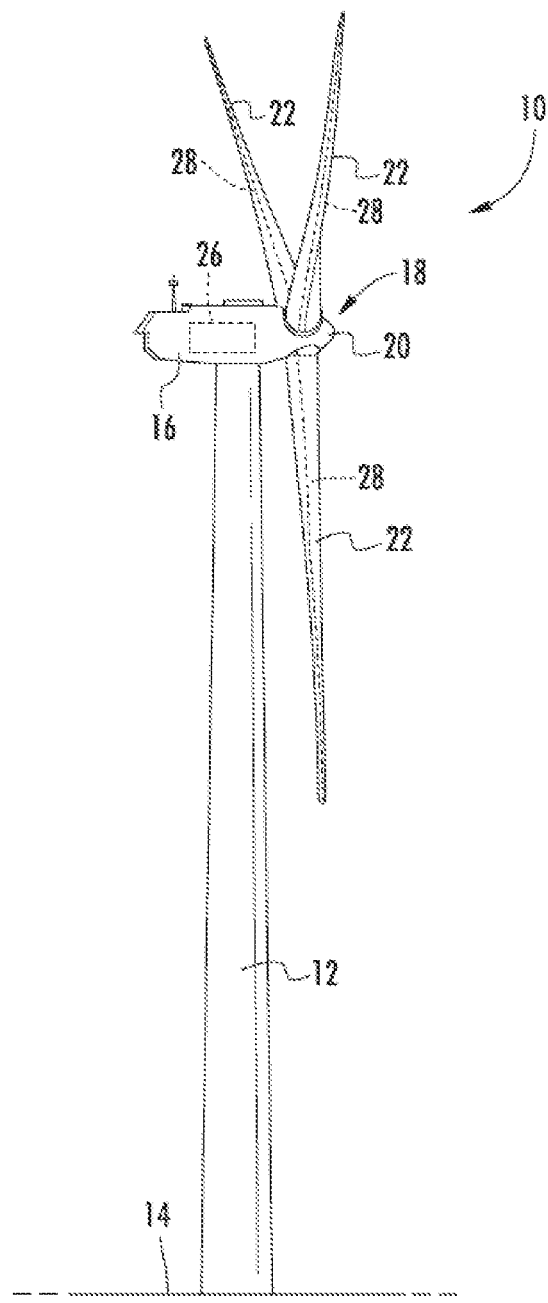
FIG. 1 illustrates one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for dynamically controlling a wind turbine in real-time by controlling speed and thrust in the most active control loop in order to effect a reduction in operating fatigue on major structural components, e.g. the tower, nacelle, hub, and/or rotor blades, while simultaneously maximizing power. More specifically, the system operates the wind turbine based on a thrust set point and a speed set point. The system then determines a desired change in actual speed and a desired change in actual thrust of the wind turbine in response to control actuations starting from an instantaneous operating point. It should be understood that the instantaneous operating point may include one or more operational aspects of the wind turbine, including, but not limited to a wind speed, a pitch angle, a generator speed, a power output, a torque output, a tip speed ratio, a rotor speed, a power coefficient, a torque coefficient, a thrust coefficient, a thrust, a thrust response, a blade bending moment, a shaft bending moment, a tower bending moment, a speed response, or similar. Utilizing multi-variable control, the system then determines a pitch set point and torque set point that will achieve the desired changes in actual speed and actual thrust and dynamically controls the wind turbine based on the pitch and torque set points so as to regulate loads acting on the wind turbine, while simultaneously maintaining optimal or near-optimal power output.

The various embodiments of the system and method described herein provide numerous advantages not present in the prior art. For example, as mentioned, the variable thrust from the wind on the rotor is a major contributor to fatigue loading, along with any asymmetry of that thrust. Though the thrust is related to power output and the rotor speed, it not synonymous or linearly proportional with either one. As such, in some operating regions, the present disclosure allows control of the thrust acting on the wind turbine with less than proportional effect on power, or vice versa. The present disclosure also provides control of speed and thrust almost independently of each other in various operating regions. The power of the wind turbine is still controlled, but often with a greater allowance for short-term error and a slower response than in conventional wind turbines, which may become particularly noticeable when observing the power output at rated power. Thus, the de-emphasis of tight control of instantaneous power becomes particularly acceptable as a certain amount of energy storage starts to appear on sites, which can be used to smooth the power output to the grid through the fluctuations allowed, but is acceptable in some cases even without energy storage. In addition, the present disclosure may be implemented using existing components of many modern wind turbines. As such, a user is not required to purchase, install, and maintain new equipment. Moreover, the system may be integrated with a broader control system, such as, but not limiting of, a wind turbine control system, a plant control system, a remote monitoring system, or combinations thereof.

Referring now to the figures, FIG. 1 illustrates a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
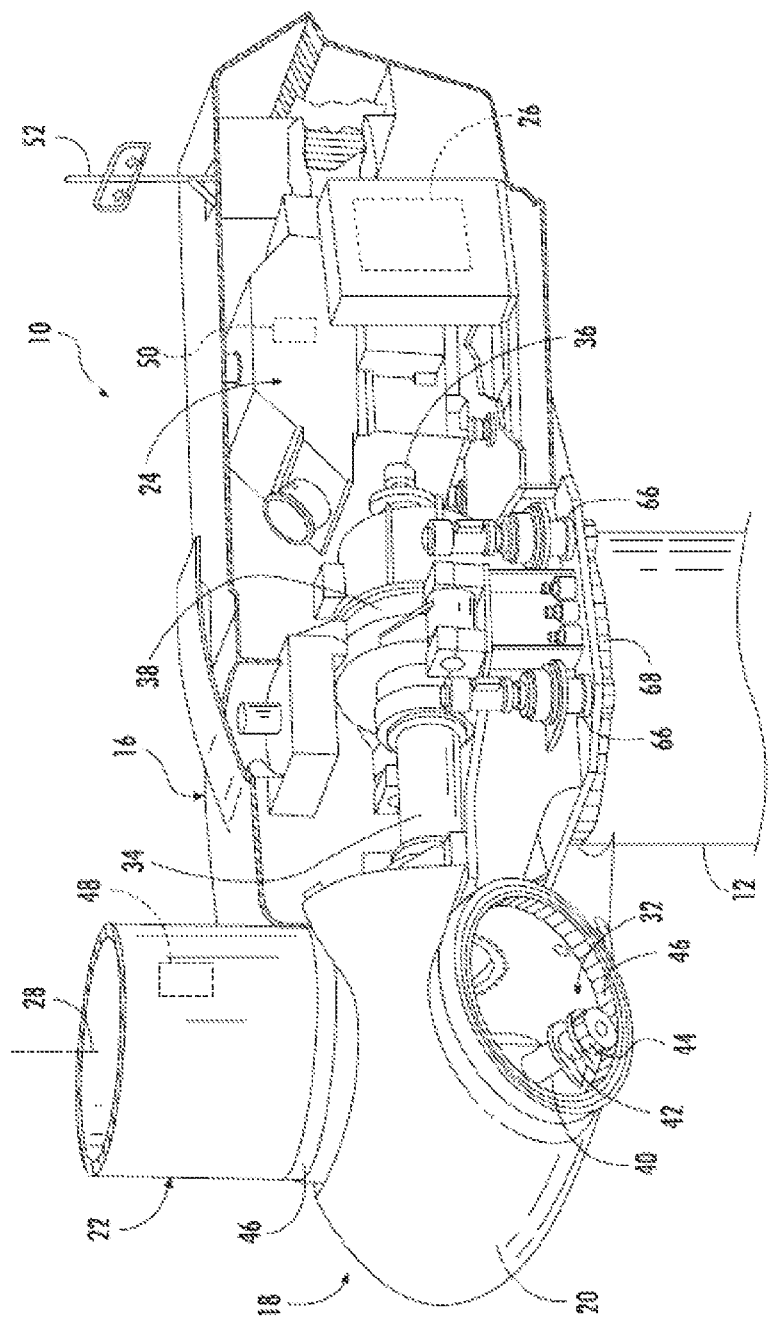
FIG. 2 illustrates one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. In further embodiments, the wind turbine 10 may employ direct drive pitch or a separate pitch drive systems including hydraulics. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50, 52 for measuring operating and/or loading conditions of the wind turbine 10. For example, in various embodiments, the sensors may include blade sensors 48 for measuring a pitch angle of one of the rotor blades 22 or for measuring a loading acting on one of the rotor blades 22; generator sensors 50 for monitoring the generator 24 (e.g. torque, speed, acceleration and/or the power output); and/or various wind sensors 52 for measuring various wind parameters, such as wind speed, wind peaks, wind turbulence, wind shear, changes in wind direction, air density, or similar. Further, the sensors may be located near the ground of the wind turbine 10, on the nacelle 16, or on a meteorological mast of the wind turbine 10. It should also be understood that any other number or type of sensors may be employed and at any location. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
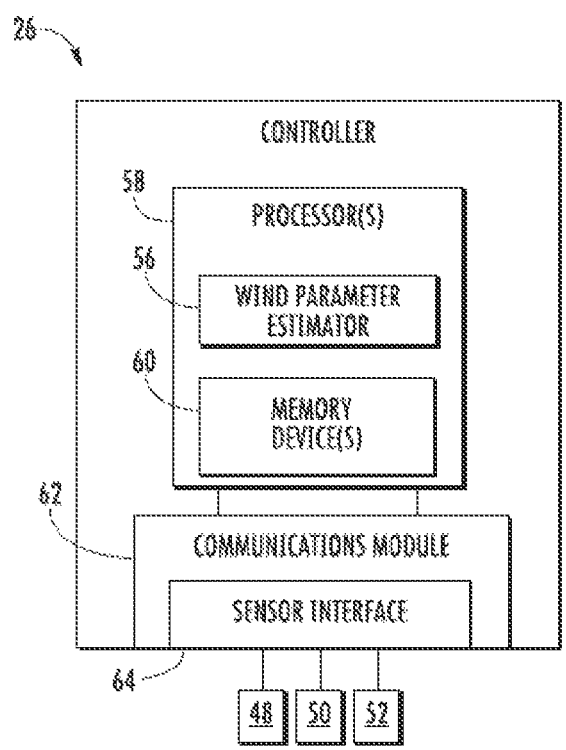
FIG. 3 illustrates a schematic diagram of one embodiment of a controller of a wind turbine according to the present disclosure.

Referring now to FIG. 3, a block diagram of one embodiment of the controller 26 according to the present disclosure is illustrated. As shown in FIG. 3, the controller 26 may include one or more processor(s) 58, a wind turbine parameter estimator 56, and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52 to be converted into signals that can be understood and processed by the processors 58. It should be appreciated that the sensors 48, 50, 52 may be communicatively coupled to the communications module 62 using any suitable means. For example, as shown in FIG. 3, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, a graphics processing unit (GPUs), and/or other programmable circuits now known or later developed. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions as described herein.

Figure 4:
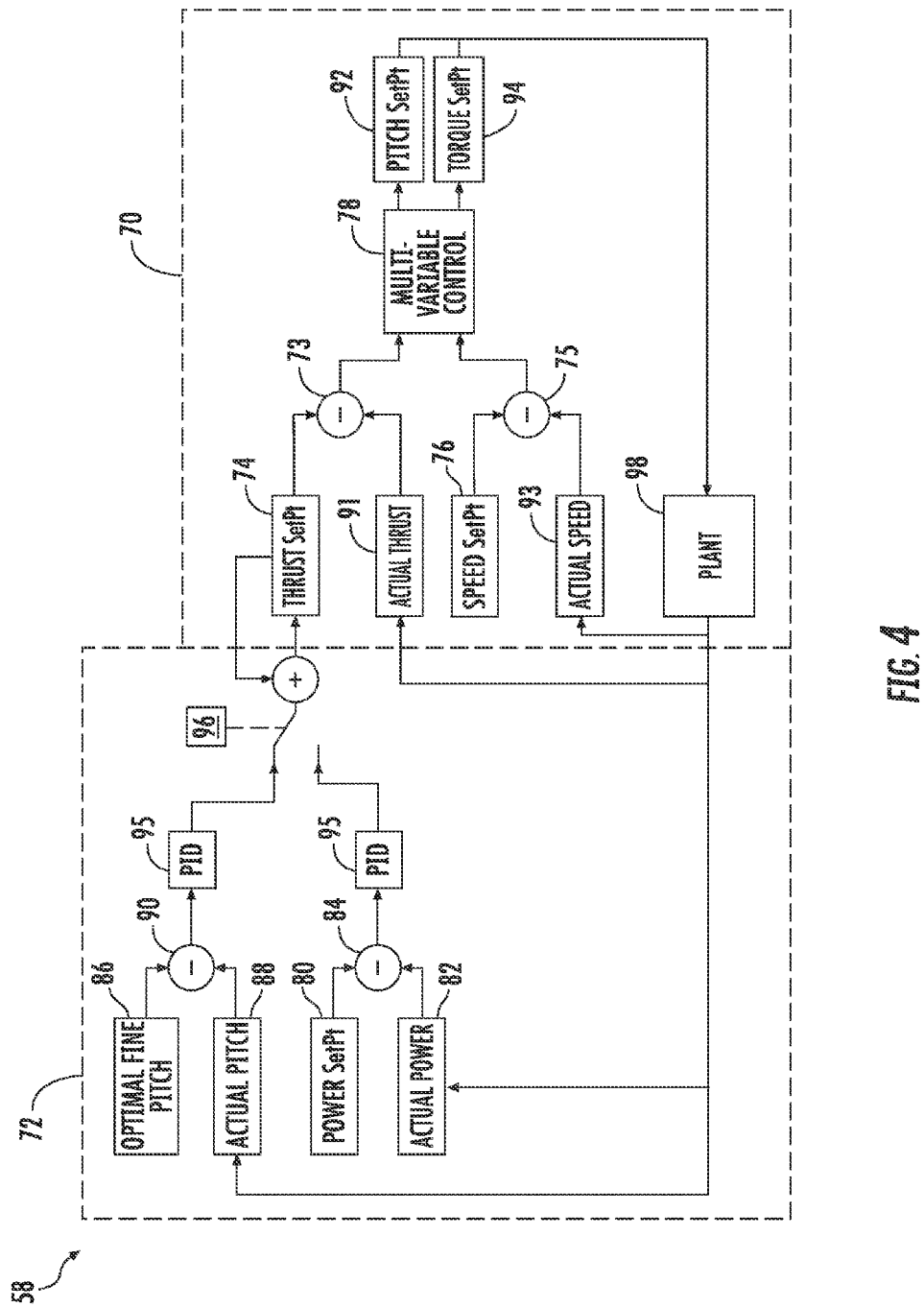
FIG. 4 illustrates a schematic diagram of one embodiment of a processor according to the present disclosure.

Referring now to FIG. 4, a block diagram to further illustrate the processor 58 according to the present disclosure is illustrated. As shown in the illustrated embodiment, the processor 58 includes an inner control loop 70 and an outer control loop 72. The outer control loop 72 is configured to control the thrust set point 74 and the speed set point 76, whereas the inner control loop 70 is configured to provide multi-variable control 78 of pitch and torque based on the thrust and speed set points 74, 76. As shown, the inner control loop 70 utilizes the thrust set point 74 and the actual or measured thrust 93 to determine the desired change in thrust 73 in response to control actuations starting from an instantaneous operating point. Similarly, the inner control loop 70 utilizes the speed set point 76 and the actual or measured speed 93 to determine the desired change in speed 75 in response to control actuations starting from the instantaneous operating point. It should be understood that the term "speed" of the wind turbine and variations thereof are representative of a generator speed, a rotor speed, a tip speed ratio, or similar. Further, the thrust set point 74 may be adjusted via the outer control loop 72. For example, in one embodiment, when the wind turbine 10 is operating above a rated wind speed, the outer control loop 72 determines or controls the thrust set point 74 based on a filtered or averaged difference 84 between the actual power 82 and the desired power set point 80. In another embodiment, when the wind turbine 10 is operating below a rated wind speed, the outer control loop 72 determines or controls the thrust set point 74 based on a filtered or averaged difference 90 between the actual pitch 88 and the optimal fine pitch setting 86. Thus, the outer control loop 72 may also include a switch 96 configured to alternate or proportionally ramp between control settings depending on the wind speed operating region. Alternatively, the thrust set point 74 and/or speed set point 76 can be scheduled as a function of estimated wind speed or determined by any other suitable means. It should be understood that the speed set point 76 may change as a function of wind speed, optimal tip speed ratio, speed limitations of the components, or similar.

The outer control loop 72 may also include one or more proportional-integral-derivative (PID) controllers 95 or similar control loop feedback mechanisms configured to calculate an error based on the difference between a measured operating point (e.g. actual pitch 88 or actual power 82) and a desired operating point (e.g. optimal fine pitch 86 or power set point 80). Thus, the PID controller(s) 95 is configured to minimize error in the outer control loop 72 by adjusting the operating points used as inputs to the inner control loop 70.

The inner control loop 70 may also include a multi-variable control 78 or multi-objective optimization framework. The multi-variable control 78 utilizes the desired changes 73, 75 in thrust and speed to determine both pitch and torque set points 92, 94 or any other suitable actuations. The multi-variable control 78 of pitch and torque actuations 92, 94 in real-time differs from conventional wind turbine control where it is common to separate such actuations according to an operating region. More specifically, in certain embodiments, the multi-variable control 78 may include linear and non-linear control approaches such as: a) Sliding Mode Control (SMC) strategies, b) H-infinity controls, c) linear-quadratic-Gaussian (LQG)/H-2 controls (shown to be equivalent), d) a mixed H-2/H-infinity approach or combination of b) and c) above, or e) a Linear Parameter Varying (LPV). The SMC strategies, in various embodiments, is characterized in that a control action that is discontinuous across a desired trajectory of the controlled parameters achieves a motion along the trajectory, and in that fashion, is able to guarantee observance of the constraints that the trajectory imposes. The H-infinity controls, in various embodiments, shape the induced L-2 norm of the system (i.e. bounded input energy to bounded output energy or otherwise, or worst case effect on output energy due to bounded energy input) that is achieved by suitable frequency domain shaping weights on input and output signals as well as the open loop transfer function. The LQG/H-2 controls, in particular embodiments, minimize the systems output variance to a white noise input, achieved by suitable frequency domain shaping weights on input and output signals. The LPV control, in certain embodiments, is characterized by the model of the system depending linearly on a measurable operating parameter of the wind turbine, thereby providing the capability of continuously changing the control actions as a function of its value, among other advanced control strategies.

Thus, allowing active control of both pitch and torque actuations 92, 94 using multi-variable control across all operating regions may provide greater power variance above rated wind speed and also larger modifications from quasi-static optimum pitch below rated wind speed. The allowance for actuation of both pitch and torque does not necessarily cause greater power variation, especially below rated wind speed; however, the regulation of thrust with a decreased relative focus on precise regulation of power often provides greater power variance above rated wind speed. The size and gains of these modifications (and limitations put upon them) can ultimately be managed to provide a beneficial trade-off against the corresponding load reductions that could allow growth in rotor diameter or other cost-of-energy and efficiency improvements.

In addition, the adjustments based on optimal fine pitch 86 (below rated wind speed) and actual power output 82 (above rated wind speed) effectively low-pass filter the raw fluctuations of the pitch and torque set points 92, 94 coming from the inner control loop 70, i.e. from plant 98. Thus, the thrust set point 74 changes in response to long-term fluctuations in wind speed, but not in response to each short wind gust. Accordingly, the controller 26 filters and rejects the thrust variations from higher frequency turbulence.

Though the source of the thrust set point 74 for the inner control loop 70 is the subject matter of the outer control loop 72, the source of the speed set point 76 may be similar to conventional methods known in the art. In addition, the actual speed 93 and the actual thrust 91 values (which are used as inputs to the inner control loop 70) can be determined via one or more sensors, e.g. 48, 50, 52, or the wind parameter estimator 56 as described below. Thus, in a particular embodiment, the thrust input may be a directly-measured quantity. In alternative embodiments, the thrust input may be an indirect measurement early in the load parth that is indicative of thrust, such as individual or collective blade out-of-plane bending, individual or collective flap-wise blade bending, individual or collective movement in the main shaft flange sensors (such as those described in U.S. Pat. No. 7,160,083 entitled, "Method and Apparatus for Wind Turbine Rotor Load Control" filed on Feb. 3, 2003 and incorporated herein by reference), or any other suitable proxy for estimating and/or determining thrust. As such, the thrust may be determined by sensors or estimated by a computer model. In addition, the sensor measurements may be filtered, calibrated, and/or checked for plausibility against the estimated thrust as determined by the computer model, while responding in raw form earlier and with higher frequency bandwidth than the estimated thrust, which is effectively low-pass filtered by the rotor inertia. As such, the actual speed 93 and the actual thrust 91 inputs can be measured values from the control transducers.

In another embodiment, the wind turbine parameter estimator 56 is configured to receive the signals from one or more sensors that are representative of various operating and/or loading conditions of the wind turbine 10. The operating conditions may consist of any combination of the following: a wind speed, a pitch angle, a generator speed, a power output, a torque output, a temperature, a pressure, a tip speed ratio, an air density, a rotor speed, a power coefficient, a torque coefficient, a thrust coefficient, a thrust, a thrust response, a blade bending moment, a shaft bending moment, a tower bending moment, a speed response, or similar. Further, the wind turbine parameter estimator 56 may be considered software that utilizes the operating and/or loading conditions to calculate, in real-time, the speed and/or thrust response as described herein. In addition, the wind turbine parameter estimator 56 may include firmware that includes the software, which may be executed by the processor 58. Accordingly, in one embodiment, the wind turbine parameter estimator 56 is configured to implement a control algorithm having a series of equations to determine the actual speed 93 and/or the actual thrust 91. As such, the equations are solved using the one or more operating conditions, one or more aerodynamic performance maps, one or more look-up tables (LUTs), or any combination thereof. In one embodiment, the aerodynamic performance maps are dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: a power coefficient, a thrust coefficient, a torque coefficient, and/or partial derivatives with respect to pitch angle, rotor speed, or tip speed ratio. Alternatively, the aerodynamic performance maps can be dimensional power, thrust, and/or torque values instead of coefficients. In various embodiments, the LUTs may include: aerodynamic performance parameters, blade bending load, tower bending load, shaft bending load, or any other turbine component load.

Referring generally to FIGS. 5-10, one embodiment of the multi-variable control 78 estimates gradients of two surfaces 83, 85 based on the instantaneous operating point, LUTs, and/or calculations. Further, the gradients represent sensitivities of thrust and speed to one or more pitch and torque actuations. Such sensitivities are used to to determine one or more parameter set points (e.g. pitch set point 92 and torque set point 94). For example, referring particularly to FIG. 5, each of the illustrated surfaces 83, 85 surround an operating point 81 on an aerodynamic performance map of the rotor 18 and extend some distance from the operating point 81 in the pitch direction (y-axis) and some distance in the torque direction (x-axis), which may be closely related to, e.g. inverse, but not synonymous with the tip speed ratio (TSR) direction on the aerodynamic performance maps. Further, as shown, the surfaces 83, 85 are planes effectively linearized at the operating point 81 of the wind turbine 10. In alternative embodiments, it should be understood that the surfaces 83, 85 may also be constructed having curvature. As mentioned, the x-axis and the y-axis represent the torque set point 94 and the pitch set point 92, respectively, or the change therein and the z-axis represents either the thrust or speed set responses for one surface 83, 85 or the other. Further, the x- and y-axes may be constructed either in terms of absolute torque and pitch set points or relative torque and pitch set points.

Figure 8:
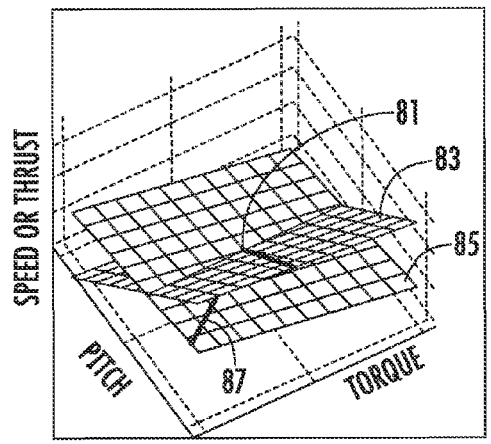
FIG. 8 illustrates a three-dimensional graph of one embodiment of thrust and speed sensitivity surfaces on a pitch-torque domain at slightly above rated wind speeds according to the present disclosure.
Figure 9:
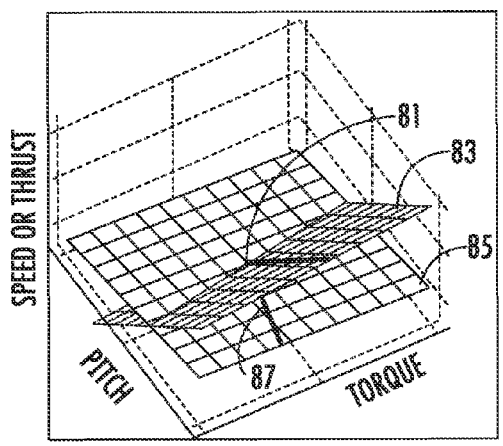
FIG. 9 illustrates a three-dimensional graph of one embodiment of thrust and speed sensitivity surfaces on a pitch-torque domain at well above rated wind speeds according to the present disclosure.
Figure 10:
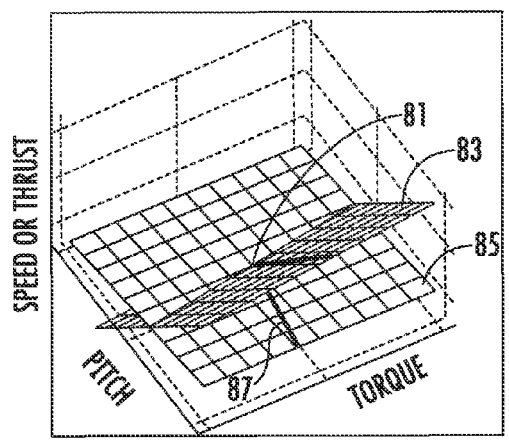
FIG. 10 illustrates a three-dimensional graph of one embodiment of thrust and speed sensitivity surfaces on a pitch-torque domain at high or cut-out wind speeds according to the present disclosure.

In one embodiment, the graphs of FIGS. 5-10 are representative of one or more operating regions for the wind turbine 10. For example, as shown in the figures, six different operating regions are evaluated, namely, a low wind speed operating region (FIG. 5), a slightly below rated wind speed operating region (FIG. 6), a rated wind speed operating region (FIG. 7), a slightly above rated wind speed operating region (FIG. 8), a well above rated wind speed operating region (FIG. 9), and a high or cut-out wind speed operating region (FIG. 10). It should be understood by those skilled in the art that any number of operating regions may be evaluated including more than six or less than six and the calculation of surfaces about the operating point can take place during each control cycle, effectively covering continuously the entire operating space. Each operating region includes an operating point 81. For example, in one embodiment, the operating point 81 corresponds to a particular wind speed, a tip speed ratio, and a pitch angle. In additional embodiments, it should be understood that the operating point 81 may include any operational point of the wind turbine 10, including, but not limited to a wind speed, a pitch angle, a generator speed, a power output, a torque output, a tip speed ratio, a rotor speed, a power coefficient, a torque coefficient, a thrust coefficient, a thrust, a thrust response, a blade bending moment, a shaft bending moment, a tower bending moment, a speed response, or similar. Further, it should be understood that the operating point 81 may be any dimensional or non-dimensional parameter representative of an operating set point of the wind turbine 10. More specifically, for above rated wind speeds, the operating point 81 corresponds to a filtered or average power output 84, whereas for below rated wind speeds, the operating point 81 corresponds to a filtered or average fine pitch 90. The controller 26 operates the wind turbine 10 based on the operating point 81 and determines corresponding gradients of the thrust and speed represented by surfaces 83 and 85, respectively.

In various embodiments, the slopes of the planes of the surfaces 83, 85 are the partial derivatives of the thrust or speed with respect to pitch or resisting torque. For example, in a particular embodiment, the partial derivatives are calculated according to Equations 1 through 6 below:

$$\frac{\partial T}{\partial \theta} = \frac{1}{2}\rho U^2 \pi R^2 \cdot \left( \text{lookup} \frac{\partial C_T}{\partial \theta} + \text{lookup} \frac{\partial C_T}{\partial \lambda} \cdot \frac{(t_1 - t_0)\rho U \pi R^4}{-2J_r} \cdot \text{lookup} \frac{\partial C_M}{\partial \theta} \right)$$ Equation 1

$$\frac{\partial T}{\partial M} = \frac{1}{2}\rho U \pi R^3 \cdot \left( \text{lookup} \frac{\partial C_T}{\partial \lambda} \right) \cdot -\frac{t_1 - t_0}{J_r}$$ Equation 2

$$\frac{\partial T}{\partial U} = \left( -\frac{1}{2}\rho \omega \pi R^3 \right) \cdot \text{lookup} \frac{\partial C_T}{\partial \lambda} + (\rho U A) \cdot \text{lookup } C_T$$ Equation 3

$$\frac{\partial \omega}{\partial \theta} = \frac{(t_1 - t_0)\rho U^2 \pi R^3}{-2J_r} \cdot \left( \text{lookup} \frac{\partial C_M}{\partial \theta} \right)$$ Equation 4

$$\frac{\partial \omega}{\partial M} = \frac{t_1 - t_0}{J_r}$$ Equation 5

$$\frac{\partial \omega}{\partial U} = \left( \frac{t_1 - t_0}{J_r} \right) \cdot \left[ \left( -\frac{1}{2}\rho \pi R_r^4 \omega \right) \cdot \text{lookup} \frac{\partial C_M}{\partial \lambda} + (\rho \pi R_r^3 U) \cdot \text{lookup } C_M \right]$$ Equation 6 where
T is the thrust;
$\theta$ is the pitch angle;
M is the moment or torque;
$\omega$ is rotor speed;
$C_T$ is the thrust coefficient;
U is the wind speed;
$\rho$ is the air density;
t is the time;
R or $R_r$ is the rotor radius;
$C_M$ is the moment coefficient corresponding to the aerodynamic torque on the rotor;
$J_r$ is the effective moment of inertia of the rotor and/or the drive train system; and
$\lambda$ is the tip-speed ratio (TSR).

As shown, some of the variables of Equations 1 through 6 may be determined using from one or more look-up tables (LUTs), e.g. $C_M$, stored within the controller 26 as indicated by the term "lookup" in the equations above. As shown, the graphs illustrate the normalized, potential thrust and speed responses of the plant 98 as functions of pitch and torque around the various operating points 81. In addition, FIGS. 5-10 illustrate gradient directions for each surface 83, 85 superimposed on the response surfaces in bold lines.

Figure 11:
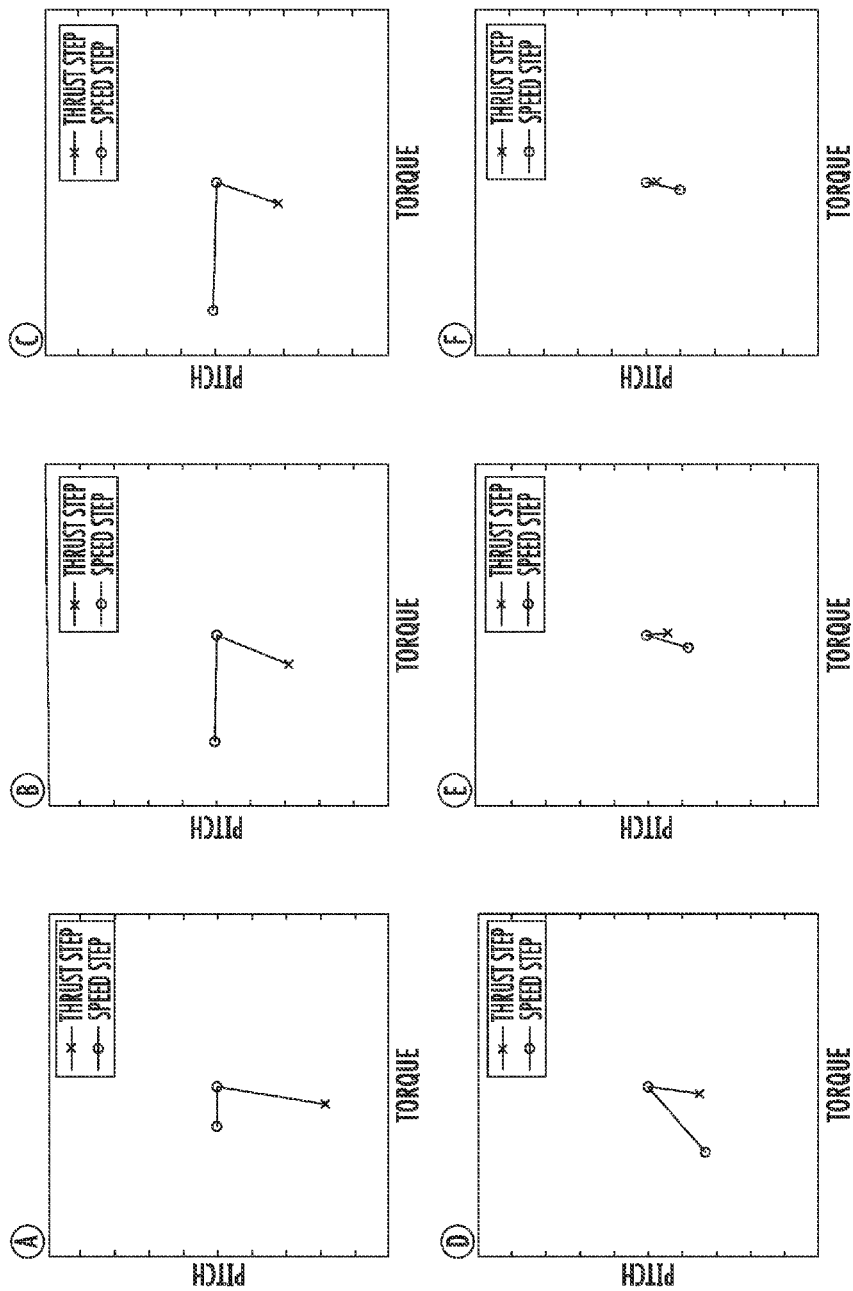
FIG. 11 illustrates a plurality of two-dimensional graphs corresponding to FIGS. 5-10, wherein each of the graphs includes a vector representing the thrust and speed sensitivities according to the present disclosure; and, FIG. 12 illustrates the graphs of FIG. 11, wherein each of the graphs further includes typical directions of the pitch and torque actuations on the thrust and speed sensitivity surfaces according to the present disclosure.
Figure 12:
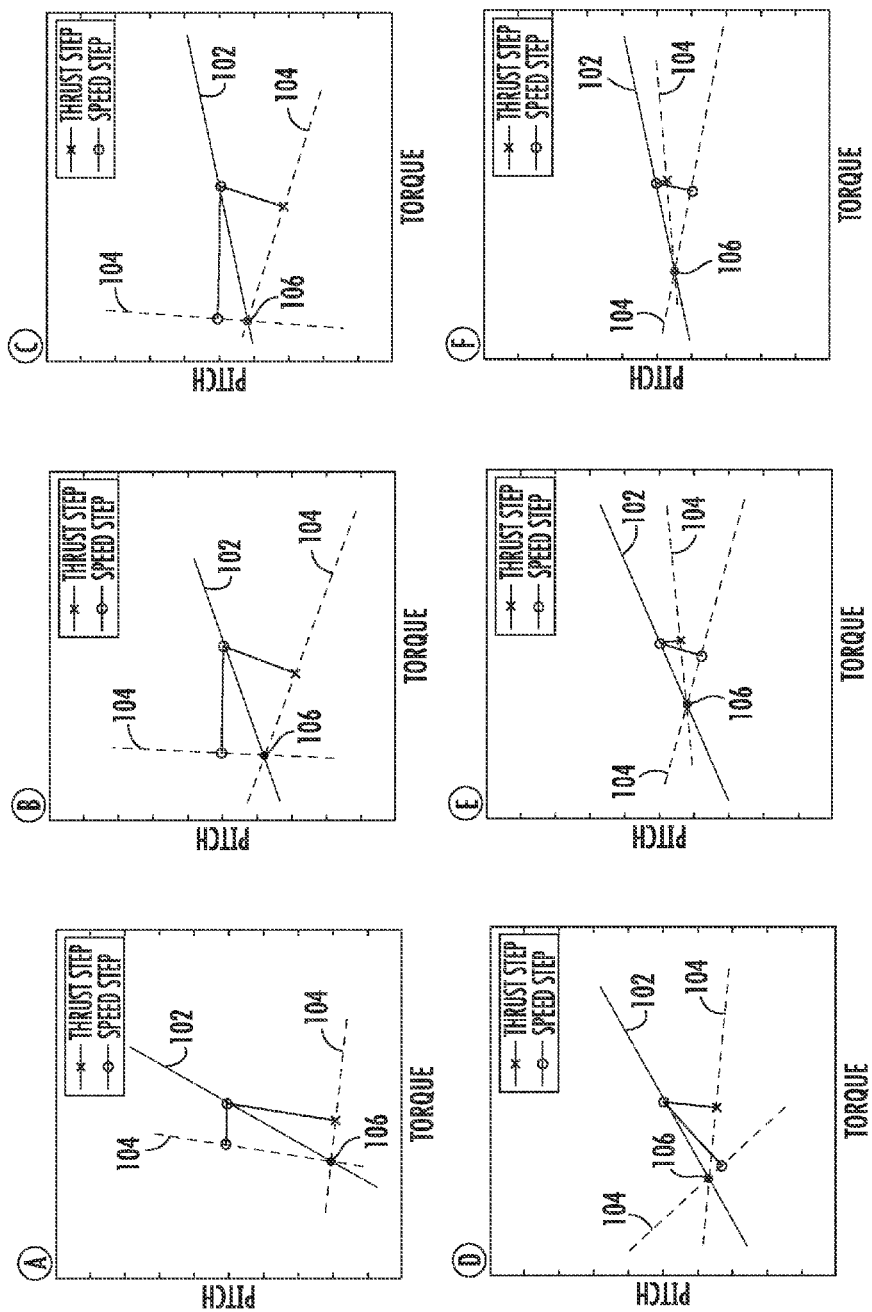

Though FIGS. 5-10 provide a visual representation of thrust-speed control, the graphs of FIGS. 11 and 12 illustrate gradient directions and inverse slopes for purposes of visualization and design. More specifically, FIG. 11 illustrates a set of six plots that present the same information depicted in FIGS. 5-10 in a more compact and user-friendly form. For example, the plots illustrate vectors in the directions of the thrust and speed gradients 83, 85 on the pitch-torque surface for each operating region. In the illustrated embodiments, the length of each vector is the actuation required to compensate a predetermined step in wind speed, e.g. 1 m/s, at each operating point 81, thus relating the partial derivatives with respect to wind speed. In an alternative embodiment, the controller 26 may generate plots corresponding to the step responses necessary to compensate a change in wind speed, e.g. a 10% change in wind speed, or any other suitable proportionality. Further, as shown, sensitivities may be linear or linearized; however, it should be understood by those of ordinary skill in the art that there is likely some nonlinearity in all regions and such nonlinearity may be included directly or otherwise accounted or corrected for in certain embodiments.

Figure 5:
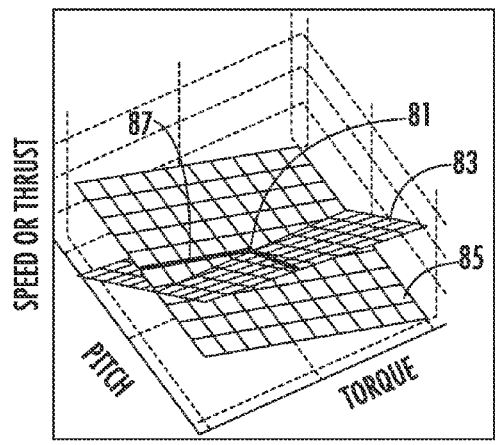
FIG. 5 illustrates a three-dimensional graph of one embodiment of thrust and speed sensitivity surfaces on a pitch-torque domain at low wind speeds (i.e. below a variable wind speed region) according to the present disclosure.

Referring particularly to FIGS. 5 and 11(A), the thrust and speed sensitivity surfaces 83, 85 for low wind speeds, typically around 2 to 4 meters/second (m/s), are illustrated. As shown, the surfaces 83, 85 are sloped in different directions at low wind speeds. The sensitivities in thrust and speed with the least actuations, i.e. the gradients of the surfaces 83, 85, are nearly perpendicular on the pitch-torque domain (as shown by the bold line of FIG. 5), with pitch primarily affecting thrust and torque primarily affecting speed. The near-perpendicular gradients are desirable and indicate that the actuation for thrust and speed may be controlled nearly independent of each other. Thus, it is possible to accomplish precise regulation of both thrust and speed simultaneously whenever wind speed rates of change remain within actuator bandwidths. As such, at low wind speeds and some rotor designs, thrust-speed control provides a reduction in fatigue loads while also regulating rotor speed, while pitch may vary slightly around what is considered optimal for power production. Further, the degree to which pitch deviates from the quasi-static aerodynamic optimum may be chosen by selection of filtering and/or gains in the outer control loop 72 as well as by imposition of limitations, striking a balance between desired fatigue reduction, and/or close adherence to the quasi-static aerodynamic optimum pitch.

Figure 6:
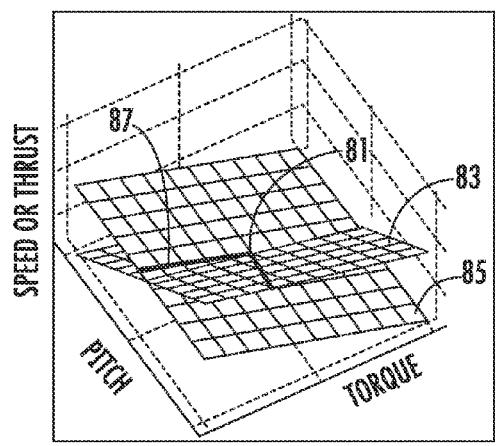
FIG. 6 illustrates a three-dimensional graph of one embodiment of thrust and speed sensitivity surfaces on a pitch-torque domain at slightly below rated wind speeds according to the present disclosure.

FIG. 6 illustrates the thrust and speed response surfaces 83, 85 for wind speeds at slightly below rated wind speed, e.g. typically around 4 to 8 m/s. As shown, thrust-speed control is capable of regulating the thrust precisely and simultaneously with rotor speed. Further, the potential fatigue benefit at this wind speed increases when compared to the benefit at lower wind speeds since both the rotor thrust and variations therein are greater than at lower wind speeds. For example, FIG. 11(B) illustrates the corresponding thrust-speed vector on the pitch-torque domain for the operating region. As shown, the thrust-speed vector is similar to the vector of 11(A), though the gradients of the surfaces 83, 85 are less perpendicular on the pitch-torque domain.

Figure 7:
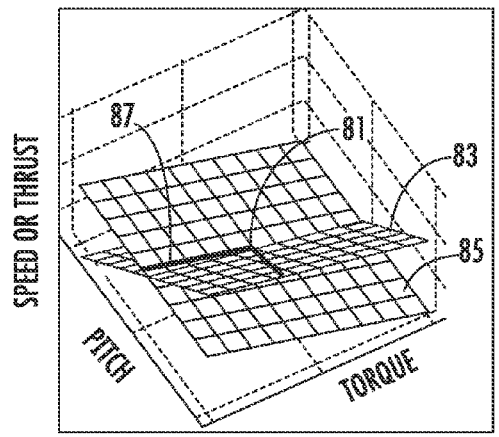
FIG. 7 illustrates a three-dimensional graph of one embodiment of thrust and speed sensitivity surfaces on a pitch-torque domain at rated wind speeds according to the present disclosure.

At rated or near rated wind speeds, and before the rotor blades 22 begin to pitch back, in at least some embodiments, the controller 26 is also capable of regulating thrust precisely and simultaneously with speed, similar to slightly below rated wind speed. Rated wind speeds vary per wind turbine, but typically range from about 8 m/s to about 15 m/s. Thus, as shown in FIG. 7, the thrust and speed response surfaces 83, 85 can be controlled virtually independent of each other. FIG. 11(C) illustrates the corresponding thrust-speed vector on the pitch-torque domain for the operating region. Accordingly, the largest opportunity for a reduction in fatigue loads is typically seen at this operating range, since the average thrust is high and potential variations in the thrust are correspondingly large. Further, as shown in FIG. 11(C), the thrust-speed vector is similar to the vector of FIG. 11(B). In certain operating regions, and particularly near rated power (i.e. where thrust tends to be high), the thrust set point 74 may saturate at a maximum value or schedule of maximum values, including but not limited a value or values derived from the maximum loads on hardware components of the turbine in certain wind conditions or design load cases.

Referring to FIGS. 8 and 11(D), at slightly above rated wind speed as the rotor blades 22 begin to pitch back, in some embodiments, there is significantly more influence from pitch actuations on rotor speed. Regulation of either thrust or speed each does not have a large effect on the other since there is still a substantial difference in gradient directions in the pitch-torque domain. Thus, in this region, it is likely that both thrust and speed can be simultaneously regulated through most types of turbulence. In one embodiment, however, the controller 26 can prioritize speed or thrust in this operating region or any other operating region following a particular wind gust and provide appropriate control thereafter.

As shown in FIGS. 9 and 11(E), as the rotor blades 22 pitch back, the trend of pitch actuations increasingly influencing speed may continue and the pitch actuations can dominate the slope of both the thrust and speed response surfaces 83, 85. Thus, in some embodiments, occasional changes in thrust and speed may need to be prioritized against one another and managed by the controller 26, which may allow a transient in speed to maintain good control of thrust or vice versa depending on the instantaneous operating point.

At high or cut-out wind speeds, e.g. 20 m/s, gradient alignments progress only slightly beyond those at rated wind speeds and those somewhat above rated wind speeds. For example, as shown in FIGS. 10 and 11(F), there is still a degree of separation between thrust and speed. Thus, to a certain extent, speed and thrust can be regulated independently; however, there is much more cross-effect than at rated and below wind speeds. As such, the controller 26 may allow a change in thrust in order to keep speed within predetermined bounds or may accept a transient change in speed to maintain steady a thrust.

Referring now to FIG. 12, the graph of FIG. 11 are illustrated with more detail and further include typical directions of the pitch and torque actuations 92, 94 according to the present disclosure. For example, at point 106, i.e. the intersection of the dotted lines 104, both speed and thrust control requirements are satisfied. In addition, line 102 represents a typical or predominant direction of an actuation (i.e. a change in the operating point) for a given operating region. More specifically, in one embodiment, line 102 may represent an optimal direction of the actuation as long as it holds similarly when the wind turbine 10 is slightly off to any side of the operating point. If the response steps in the direction of each gradient had a perfectly up-and-down slope orientation on a planar surface within the linearized partial derivative space, then logically the perpendicular direction would be perfectly cross-slope. Thus, in order to regulate speed or thrust to a constant through a hypothetical step, e.g. 1 m/s, the controller 26 is configured to follow each surface 83, 85 to the level of each individually optimal (for thrust or speed) response step. As such, the controller 26 can obtain the correct result at any point that is on a level with the response step (offset perpendicular to its direction), though anything other than the direction of the response step will require more from the actuators to achieve such control. Thus, the bold lines in FIGS. 5-10 and the vectors in FIG. 11(A-F) represent the points on the response surfaces that will give an ideal result for individual metrics (e.g. thrust, speed) at their respective operating point. Further, the point where the dashed lines intersect in FIG. 12(A-F) represents the point where both speed and thrust may be simultaneously controlled. As the individual-ideal steps become more closely aligned in direction, but remain different in size, the control actuation to simultaneously meet both objectives may become very large and/or out of alignment with the ideal direction for either. For example, such is the case where prioritization between the thrust and speed regulation objectives may take place in various embodiments, where constraints may be imposed to stay within the realistic limits and responses of the actuators.

In this way, the controller 26 can visualize the alignment of the two control objectives and whether simultaneously control for thrust and speed in any operating region is realistic. Further, in various embodiments, the controller 26 may be required to determine and/or prioritize whether to regulate speed or thrust regulation, e.g. where the two gradients approach either perfect alignment with different magnitude or where they approach perfect opposite directions in the pitch-torque plane for a given rotor 18. For example, as shown in FIG. 12, graphs (E) and (F) illustrate the two response steps approaching perfect directional alignment with differing magnitude. As shown, the step required to satisfy both speed and thrust tends to be increasingly off to one side or the other of the ideal steps for either thrust or speed regulation. In these areas, the controller 26 is configured to constantly control the wind turbine 10 in order to prioritize either speed or thrust and provide realistic actuation demands. In other words the controller 26 is configured to determine and/or calculate a limitation on the step in order to avoid wasted control efforts. For example, in one embodiment, a boundary proportional to the angle or half angle between the thrust gradient and speed gradient may be utilized such that the overall response is constrained within a predetermined directional range from the best ratio of desired effect per unit actuation.

Figure 13:
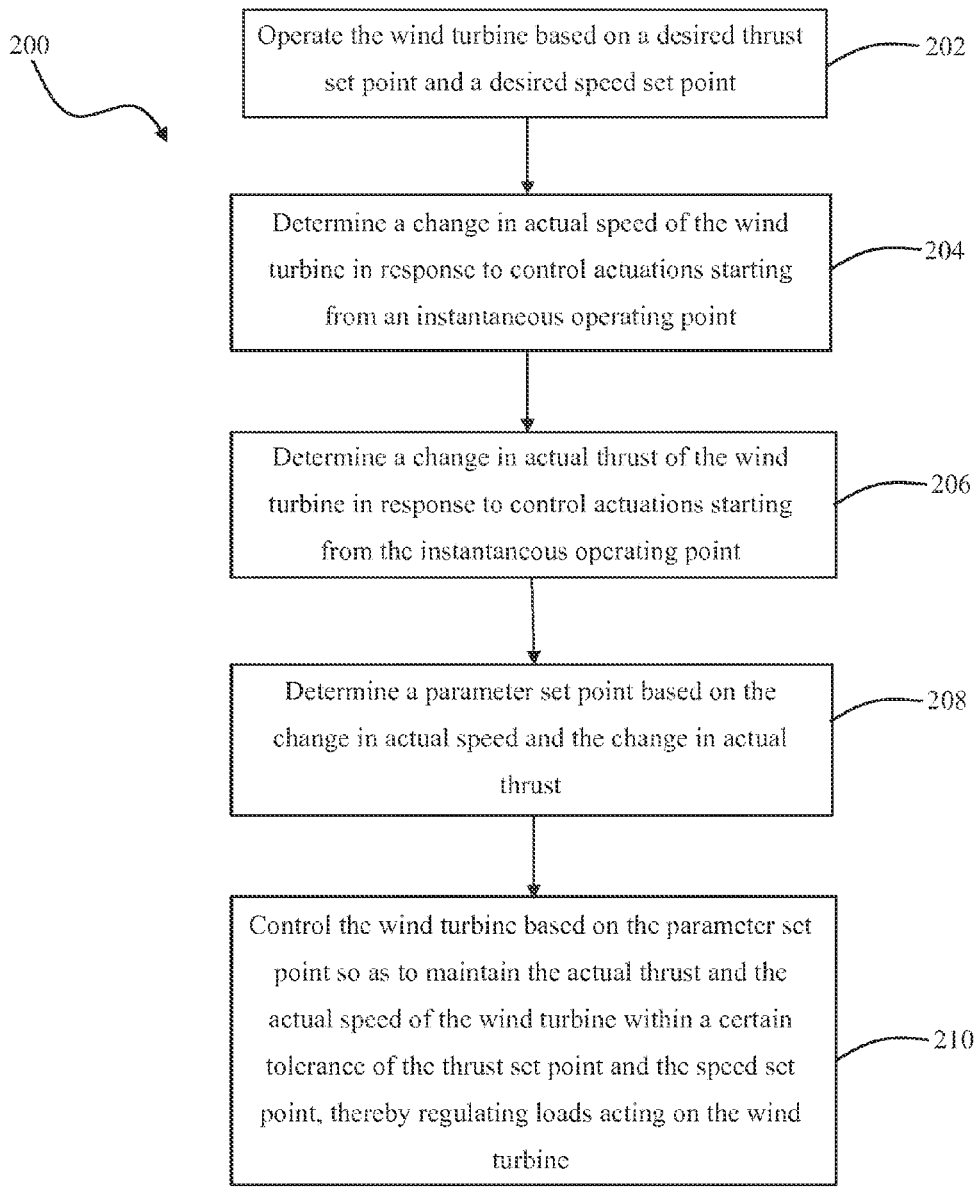
FIG. 13 illustrates a flow diagram of one embodiment of a method for dynamically controlling a wind turbine according to the present disclosure.

Referring now to FIG. 13, a flow diagram of method 200 for dynamically controlling the wind turbine 10 according to one embodiment of the present disclosure is illustrated. As mentioned, the operating point may be determined from any one or more conditions or states of the wind turbine 10, including, but not limited to pitch angle 90 or a power output 84. In additional embodiments, the operating point may include any of the following operational parameters including, but not limited to a wind speed, a pitch angle, a generator speed, a power output, a torque output, a tip speed ratio, a rotor speed, a power coefficient, a torque coefficient, a thrust, a thrust coefficient, a blade bending moment (including out-of-plane and flap-wise blade bending moments), a shaft bending moment, a tower bending moment, a speed response, or similar.

As shown, the method 200 includes a first step 202 of operating the wind turbine based on a thrust set point and a speed set point. Another step 204 includes determining a desired change in actual speed of the wind turbine in response to control actuations starting from an instantaneous operating point. Similarly, the method 200 also includes a step of determining a desired change in actual thrust of the wind turbine in response to control actuations starting from an instantaneous operating point (step 206). In certain embodiments, the step of determining the desired changes in actual speed and thrust may include taking the difference between the actual thrust or speed and the desired thrust or speed set points and filtering and/or averaging the differences, respectively.

A next step 208 includes determining at least one parameter set point that will achieve the desired change in actual speed and the desired change in actual thrust and thrust and speed sensitivities. In various embodiments, for example, the parameter set point(s) includes a pitch set point 92 and a torque set point 94. Thus, the method 200 includes a step 210 of controlling the wind turbine based on the parameter set point(s) so as to so as to maintain the actual thrust and the actual speed of the wind turbine within a certain tolerance of the thrust set point and the speed set point, thereby regulating loads acting on the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for dynamically controlling a wind turbine, the method comprising:
    operating the wind turbine based on a thrust set point and a speed set point;
    determining, via a processor, a desired change in actual speed of the wind turbine in response to control actuations starting from an instantaneous operating point;
    determining, via the processor, a desired change in actual thrust of the wind turbine in response to control actuations starting from the instantaneous operating point;
    determining, via the processor, at least one parameter set point that achieves the desired change in actual speed and the desired change in actual thrust; and
    controlling the wind turbine based on the parameter set point so as to maintain the actual thrust and the actual speed of the wind turbine within a certain tolerance of the thrust set point and the speed set point, thereby regulating loads acting on the wind turbine.

2. The method of claim 1, wherein the instantaneous operating point comprises at least one of a wind speed, a pitch angle, a generator speed, a power output, a torque output, a tip speed ratio, a rotor speed, a power coefficient, a torque coefficient, a thrust, a thrust coefficient, a thrust response, a blade bending moment, a shaft bending moment, a speed response, or a tower bending moment.

3. The method of claim 1, further comprising adjusting at least one of the thrust set point or the speed set point based on the instantaneous operating point.

4. The method of claim 1, wherein in operating regions when a wind speed is above a rated wind speed, the thrust set point is adjusted according to a filtered or unfiltered power output, wherein, when the wind speed is below the rated wind speed, the thrust set point is adjusted according to a filtered or unfiltered pitch angle, and wherein, when the wind speed is at or near rated wind speed, the thrust set point is adjusted based on a maximum design thrust of the wind turbine.

5. The method of claim 4, further comprising determining a desired change in power output based on a difference between an actual power and a power set point and determining a desired change in pitch angle based on a difference between an actual pitch and an optimal fine pitch.

6. The method of claim 1, further comprising determining the desired change in actual speed by:
  determining an actual speed of the wind turbine; and,
  determining a difference between the speed set point and the actual speed, wherein both the speed set point and the actual speed are reflective of a generator speed, a rotor speed, or a tip speed ratio.

7. The method of claim 1, further comprising determining the desired change in actual thrust by:
  determining an actual thrust of the wind turbine; and,
  determining a difference between the thrust set point and the actual thrust.

8. The method of claim 7, wherein determining the actual thrust further comprises utilizing at least one of the following: one or more sensors, a plurality of equations, one or more aerodynamic performance maps, or one or more look-up tables.

9. The method of claim 1, wherein determining the parameter set point further comprises utilizing multi-variable control.

10. The method of claim 9, wherein the multi-variable control comprises at least one of a cost function, a loss function, or a transfer function.

11. The method of claim 9, further comprising determining a speed sensitivity and a thrust sensitivity by calculating at least one partial derivative of the actual thrust or the actual speed with respect to the operating point and one or more control actuations and utilizing the speed sensitivity and the thrust sensitivity in the multi-variable control.

12. The method of claim 1, wherein the parameter set point further comprises at least one of a pitch angle set point or a torque set point.

13. A system for dynamically controlling a wind turbine, the system comprising:
  a processor configured to:
  operate the wind turbine based on a desired thrust set point and a desired speed set point;
  determine a desired change in actual speed of the wind turbine in response to control actuations starting from an instantaneous operating point;
  determine a desired change in actual thrust of the wind turbine in response to control actuations starting from the instantaneous operating point;
  determine at least one parameter set point that achieves the desired change in actual speed and the desired change in actual thrust; and
  a controller communicatively coupled to the processor, the controller configured to control the wind turbine based on the parameter set point so as to maintain the actual thrust and the actual speed of the wind turbine within a certain tolerance of the thrust set point and the speed set point, thereby regulating loads acting on the wind turbine.

14. A method for dynamically controlling a wind turbine, the method comprising:
  operating the wind turbine based on a thrust set point and a speed set point;
  determining, via a processor, a desired change in actual rotor speed of the wind turbine in response to control actuations starting from an instantaneous operating point;
  determining, via the processor, a desired change in actual thrust of the wind turbine in response to control actuations starting from an instantaneous operating point;
  utilizing, via the processor, multi-variable control to determine a pitch set point and a torque set point that achieves the desired change in actual rotor speed and the desired change in actual thrust; and
  controlling the wind turbine based on the pitch set point and the torque set point so as to maintain the actual thrust and the actual speed of the wind turbine within a certain tolerance of the thrust set point and the speed set point, thereby regulating loads acting on the wind turbine.

15. The method of claim 14, wherein the instantaneous operating point comprises at least one of a wind speed, a pitch angle, a generator speed, a power output, a torque output, a tip speed ratio, a rotor speed, a power coefficient, a torque coefficient, a thrust, a thrust coefficient, a thrust response, a blade bending moment, a shaft bending moment, a speed response, or a tower bending moment.

16. The method of claim 14, further comprising adjusting at least one of the thrust set point or the speed set point based on the instantaneous operating point.

17. The method of claim 14, wherein in operating regions when a wind speed is above a rated wind speed, the thrust set point is adjusted according to a power output, wherein, when the wind speed is below the rated wind speed, the thrust set point is adjusted according to a filtered pitch angle, and wherein, in operating regions at or near rated wind speed, the thrust set point is adjusted based on a maximum design thrust of the wind turbine.

18. The method of claim 17, further comprising determining the power output based on a difference between an actual power and a power set point and determining the pitch angle based on a difference between an actual pitch and an optimal fine pitch.

19. The method of claim 14, further comprising determining the desired change in actual rotor speed by:
  determining an actual rotor speed of the wind turbine; and,
  determining a difference between the rotor speed set point and the actual rotor speed.

20. The method of claim 14, further comprising determining the desired change in actual thrust by:
  determining an actual thrust of the wind turbine; and,
  determining a difference between the thrust set point and the actual thrust.

* * * * *